(12) United States Patent
Tobler

(10) Patent No.: US 6,921,139 B2
(45) Date of Patent: Jul. 26, 2005

(54) METHOD OF CONTROLLING THE BRAKING DEVICE OF A TRAILER AND BRAKING DEVICE OPERATING ACCORDING TO THIS METHOD

(75) Inventor: Sebastian Tobler, Corpataux (CH)

(73) Assignee: Zbinden Posieux SA, Posieux (CH)

( * ) Notice: Subject to any disclaimer, the term of this patent is extended or adjusted under 35 U.S.C. 154(b) by 0 days.

(21) Appl. No.: 10/654,444

(22) Filed: Sep. 4, 2003

(65) Prior Publication Data

US 2004/0051374 A1 Mar. 18, 2004

(30) Foreign Application Priority Data

Sep. 18, 2002 (EP) .............................................. 02405811

(51) Int. Cl.[7] .............................. B60T 7/20; B60T 13/08
(52) U.S. Cl. ........................... 303/7; 188/112 R; 303/20
(58) Field of Search .............................. 303/7, 15, 123, 303/20; 188/112 R, 3 R, 3 H, 112 A; 701/70

(56) References Cited

U.S. PATENT DOCUMENTS

| 5,002,343 A | * | 3/1991 | Brearley et al. | ............... 303/7 |
| 5,281,006 A | | 1/1994 | Gotz et al. | |
| 5,295,736 A | * | 3/1994 | Brearley | .......................... 303/7 |
| 5,480,215 A | * | 1/1996 | Stender et al. | .................. 303/7 |
| 5,522,649 A | * | 6/1996 | Stender et al. | .................. 303/7 |
| 2004/0051374 A1 | * | 3/2004 | Tobler | ......................... 303/123 |

FOREIGN PATENT DOCUMENTS

| DE | 44 29 231 C 1 | | 8/1995 |
| DE | 195 19 768 A 1 | | 12/1996 |
| EP | 001400423 A1 | * | 3/2004 |

* cited by examiner

Primary Examiner—Douglas C. Butler
(74) Attorney, Agent, or Firm—Oliff & Berridge, PLC

(57) ABSTRACT

A method for controlling a braking device equipping a trailer includes braking the towing vehicle. The force induced in a coupling device is measured, at least at a given moment, and compared with a target value. When the difference between the force and the target value deviates from a predetermined tolerated threshold, the braking elements may be actuated. The method may be repeated until the difference between the intensity of the measured induced force and the target value is less than the predetermined tolerated threshold. The moment when the towing vehicle and the trailer are about to roll may be detected and monitored. Starting from that moment, the intensity of the force induced in the coupling device is measured and the average of the intensity of the induced force may be calculated and stored. The target value may be the average value of the induced force.

24 Claims, 2 Drawing Sheets

Figure 1:
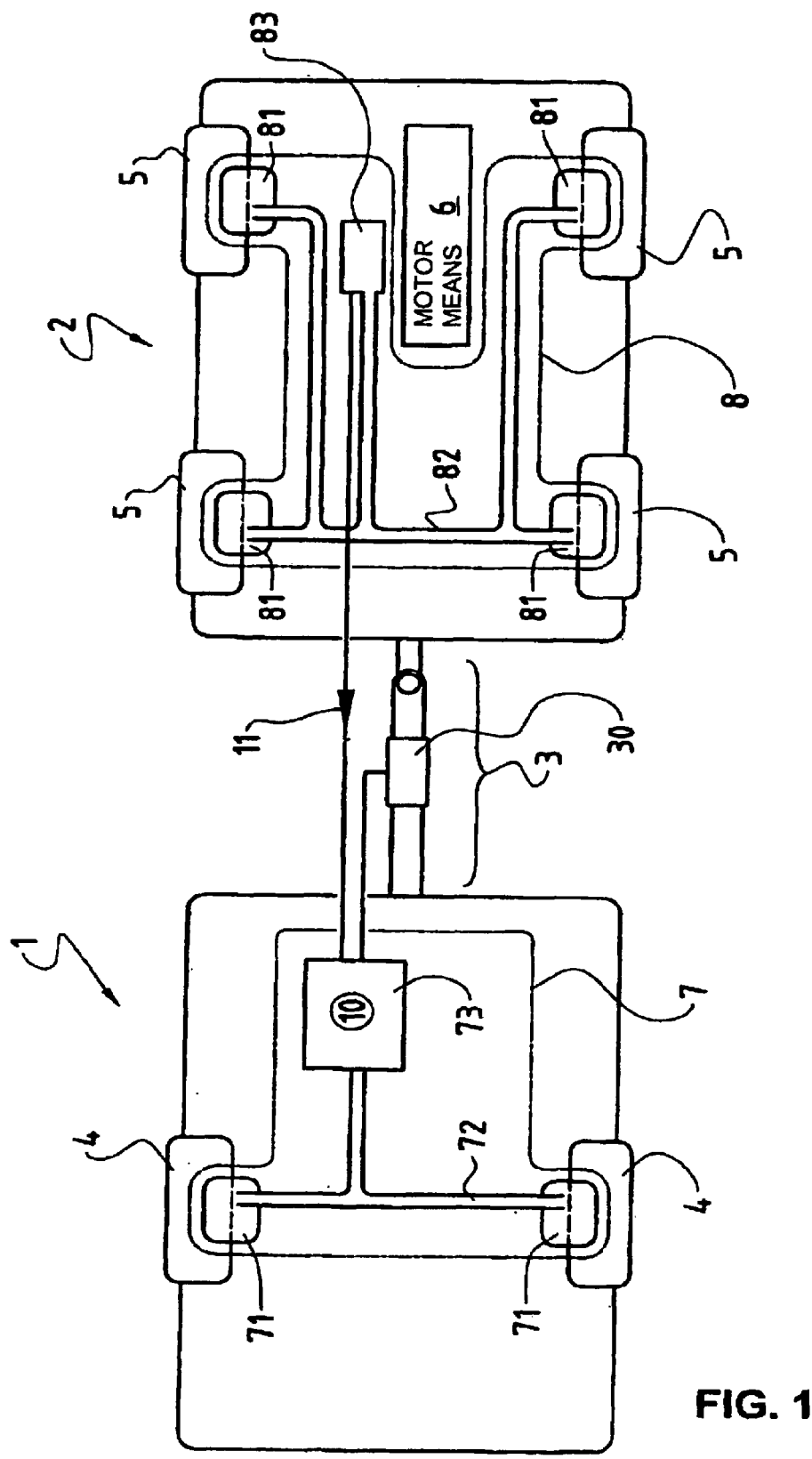

METHOD OF CONTROLLING THE BRAKING DEVICE OF A TRAILER AND BRAKING DEVICE OPERATING ACCORDING TO THIS METHOD

The invention relates to a method of controlling a braking device equipping a trailer vehicle, this vehicle being connected through a coupling device to another vehicle, referred to as the towing vehicle. The invention likewise relates to a braking device for a trailer vehicle, which device comprises a controlling apparatus which implements the aforesaid method. The invention also relates to trailer vehicles equipped with said braking device.

The invention concerns more particularly, but not exclusively, the domain of non-dedicated trailers, i.e. trailer vehicles which are coupled to a towing vehicle of light-weight type. Meant by light-weight vehicle are vehicles whose total loaded weight does not exceed three thousand five hundred kilograms.

A braking device for a vehicle comprises in general braking elements each connected to a wheel of the vehicle as well as a means allowing the simultaneous actuation of these braking elements when the driver of the towing vehicle wishes to brake.

Known in this field is the actuation of the braking elements for the wheels of the trailer vehicles by means of devices of the type referred to as "overrunning brakes," i.e. with devices which are sensitive to the deceleration of the towing vehicle, consequently to the operation of the braking device of said towing vehicle. These actuation apparatuses are placed in the device for coupling the vehicles, and are conceived so as to exploit a relative displacement of said trailer vehicle toward said towing vehicle to activate the braking elements of the trailer vehicle.

These apparatuses are preferably very simple in construction and essentially comprise, for example, a mechanical control activating the braking elements for the wheels of the trailer vehicle via cables and rods. Speaking against these overrunning type braking control apparatuses, however, is, on the one hand, ill-timed or inopportune operation when these vehicles descend a steep slope and, on the other hand, not braking when the vehicles are backing up on a descending slope.

To solve this, the preferred solution consists of putting the braking elements of the trailer vehicle under the influence of the actuation element, such as the brake pedal, which is used to control the braking device of the towing vehicle. This requires, in general, significant adaptations made in the towing vehicle in order to make possible proportional and simultaneous control of the braking devices of the two vehicles, the trailer vehicle and the towing vehicle. This proportional and simultaneous control of the braking devices of the towing and trailer vehicles does not permit dealing with cases of excessive braking or of insufficient braking of the trailer vehicle, however.

Known, as a way of overcoming this drawback, is to influence the operation of the braking device of the trailer vehicle as a function of the intensity of the force induced in the coupling device during the braking. To this end, the part of the coupling device equipping the towing vehicle is provided with a force detector and said towing vehicle itself is equipped with a controlling apparatus which, during braking of the towing vehicle:

measures the intensity of the force induced in the coupling device, at least at a given instant, then compares the measured intensity of the induced force at the given instant under consideration with a target value determined beforehand and, when the difference between the measured intensity of the induced force and said target value is greater than a predetermined tolerated threshold, commands the actuation of the braking elements of the trailer vehicle to influence the braking of said trailer vehicle, and repeats the aforementioned steps of measuring, comparing and commanding the braking until the difference between the measured intensity of the induced force and the target value are less than the predetermined tolerated threshold.

A controlling apparatus operating according to this known method has its advantages, but its operation is optimal only under very specific conditions.

In fact, since the target value is fixed, the method does not permit taking into account the declivity of the route or the use of a retarder device such as an induced current brake. Resulting therefrom is a non-harmonious progression of braking between the towing vehicle and the trailer vehicle.

The functioning of the aforementioned apparatus is no longer provided for when managing an act of braking actuated when the coupled vehicles are moving backwards down a slope.

One result which the invention aims to obtain is, precisely, a control method which allows the weight of the trailer vehicle to be taken into account and which gauges itself automatically with a view to ensuring a better performance of said trailer vehicle and of the towing vehicle, and this when these vehicles are rolling freely as well as when they are braking.

Another result which the invention aims to obtain is a control method which allows actuation of the braking in forward drive or in reverse drive of the vehicles.

Still another result which the invention aims to obtain is a control method which allows the assembly of functional means necessary to control the braking of the trailer vehicle to be centralized on said trailer vehicle.

Other results of the invention are mentioned in the following.

The invention has as its object a control method of the aforementioned type, this method being characterized in particular in that:

through monitoring, the instant starting from which the towing vehicle and the trailer vehicle are about to roll is detected, then, starting from that instant at least in an intermittent way, the intensity of the force induced in the coupling device is measured and, for a period of measurement of predetermined duration, the average value is calculated of the intensity of the induced force and this average value is stored, after completion of the storage of an average value, the steps are repeated of measuring, calculating a new average value then of storing this new average value, replacing the average value previously stored, with a view to initiating the actuation of the braking elements of the trailer vehicle at any chosen instant after the calculation of an average value, taken as the target value is the average value of the intensity of the induced force which has been calculated in the period of measurement preceding the instant chosen to initiate said braking.

The invention likewise has as an object a braking device for a trailer vehicle, which device comprises a controlling apparatus implementing the aforementioned method.

The invention also has as an object trailer vehicles equipped with the mentioned braking device.

Figure 2:
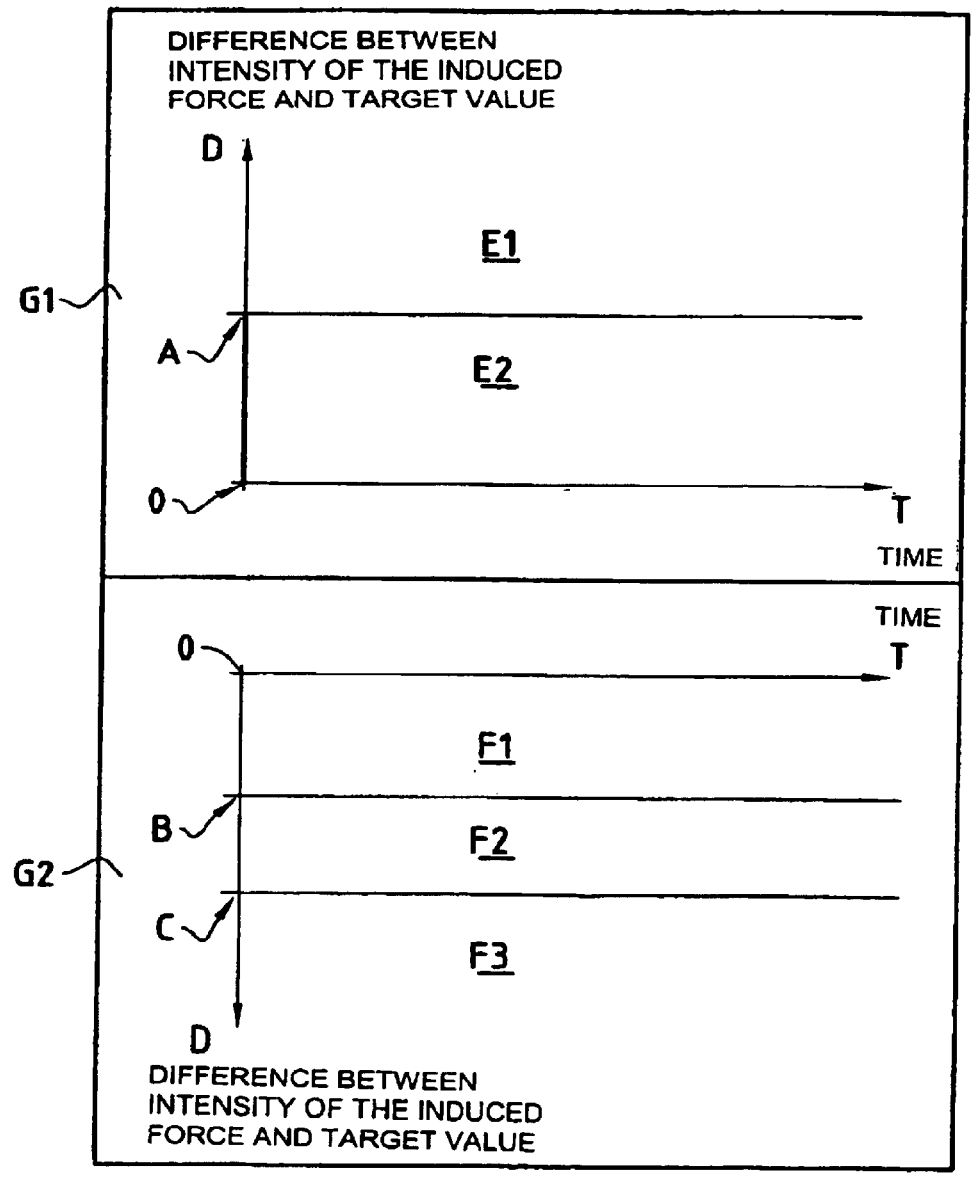

The invention will be better understood from reading the following description, given by way of non-limiting example and illustrated by the attached drawing in which FIG. 1 shows diagrammatically and from above a group of two vehicles 1, 2 connected through a coupling device 3, the trailer vehicle 1 being provided with a braking device 7 that implements the control method according to the invention, and FIG. 2 shows a table containing two graphs G1 and G2 illustrating, in a time dependency diagram, commands E1, E2, F1, F2, F3 given to the braking device of the trailer vehicle as a function of the direction of stress of the coupling device (graph G1 for the direction of compression, graph G2 for the direction of traction) and the difference D noted between the measured intensity of the induced force and said target value 10 (see also FIG. 1).

Referring to the FIG. 1, one sees a group of two vehicles 1, 2, and, to be more exact, a first vehicle 1 provided with wheels 4, referred to as the trailer vehicle 1, which is connected through a coupling device 3 to a second vehicle 2, likewise provided with wheels 5, referred to as the towing vehicle 2.

The expressions rolling trailer vehicle 1 or rolling towing vehicle 2 are also used further below.

Likewise designated by trailer vehicle 1 is a vehicle of one or more central axles, as well as a vehicle with a plurality of axles of which at least one allows itself to be driven, or even a vehicle of the semi-trailer type with one or more axles.

Designated by towing vehicle 2 is a vehicle equipped with a motor is means 6 for driving its wheels 5.

Designated by coupling device 3 is any device 3 permitting an articulated connection between the towing vehicle 3 and the trailer vehicle 1.

Although it has not been shown in the drawing, the vehicles are intended to roll on any surface foreseen for that purpose.

As has been indicated symbolically, each of the vehicles 1, 2 is equipped with a device 7, 8 for braking the rotation of its wheels 4, 5, each device 7, 8 comprising braking elements 71, 81 of said wheels 4, 5 and a circuit 72, 82 for actuation of these elements 71, 81 with a view to actuating the braking of the vehicle 1, 2 at a chosen moment.

The braking devices can be of any type, for example mechanical, hydraulic, pneumatic, electric.

As has been shown, the braking device 8 of the towing vehicle 2 also comprises an element 83 for actuation of the braking devices 81 by a person (not shown).

Although it is not obvious from the drawing, the coupling device 3 is equipped with a sensor 30 disposed for measuring the intensity of the force induced in said coupling device 3, in particular when braking, and for delivering information relating to the value of the induced force.

Designated by the expression "force induced in the coupling device" is a force which is oriented substantially axially to said coupling device. For example, when the coupling device 3 comprises a drawbar, the induced force is directed substantially axially to this drawbar.

The braking device 7 of the trailer vehicle 1 comprises a controlling apparatus 73 which uses the information emitted by the sensor 30 to control the actuation of the braking elements 71 in such a way that, during said braking, the force induced in the coupling device 3 remains less than a predetermined target value 10.

To be precise, the controlling apparatus 73 situated in the braking device 7 of the trailer vehicle 1 implements a control method according to which, during braking of the towing vehicle:
the intensity of the force induced in the coupling device 3 is measured, at least at a given instant, then
the measured intensity of the induced force at the given instant under consideration is compared with a target value 10 determined beforehand and, when the difference between the measured intensity of the induced force and said target value 10 deviates from a predetermined tolerated threshold, the actuation of braking elements 71 of the trailer vehicle 1 is initiated to influence the braking of said trailer vehicle 1, and
the aforementioned steps are repeated of measuring, comparing, and initiating the braking until the difference between the measured intensity of the induced force and the target value 10 is less than the predetermined tolerated threshold.

According to the invention, this method is noteworthy in that:
through monitoring, the instant starting from which the towing vehicle 2 and the trailer vehicle 1 are about to roll is detected, then, starting from that instant
at least in an intermittent way, the intensity of the force induced in the coupling device 3 is measured and,
for a period of measurement of predetermined duration, the average value is calculated of the intensity of the induced force and this average value is stored,
after completion of the storage of an average value, the steps are repeated of measuring, calculating a new average value then of storing this new average value, replacing the average value previously stored,
with a view to initiating the actuation of the braking elements 71 of the trailer vehicle 1 at any chosen instant after the calculation of an average value, taken as the target value 10 is the average value of the intensity of the induced force which has been calculated in the period of measurement preceding the instant chosen to initiate said braking.

In a way also noteworthy, to initiate the actuation of the braking elements 71 of the trailer vehicle 1 at any chosen instant after the calculation of an average value:
the production is monitored on the towing vehicle 2 of a signal, referred to as the operational signal, which indicates the actuation of its braking device and thus the instant chosen to initiate the braking of the vehicles, and
when the force induced in the coupling device 3 by the trailer vehicle 1 deviates with respect to the tolerated threshold predetermined with respect to the target value 10, the actuation of the braking elements 71 of the trailer vehicle 1 is initiated, with a view to correcting the intensity of said induced force, only if the signal 11 of operation of the braking device 8 of the towing vehicle 2 has been detected beforehand.

In a noteworthy way, the production is monitored on the towing vehicle 2 of a signal 11 which, referred to as the operational signal, is an electrical signal 11 produced to activate the operation of luminous signals intended to indicate the use of the brakes of said towing vehicle 2, and thus indicate the actuation of the braking device 8 of this vehicle.

On the one hand, when the actuation of the braking is detected, the process of calculation of an average value for the force induced in the coupling device 3 is interrupted, and the development of the force induced in the coupling device 3 is monitored and, on the other hand, when the braking has been achieved, the process of calculation of the average value for the force induced in the coupling device 3 is resumed.

These first technical features of the method make it possible to ensure the optimal braking of the trailer vehicle, regardless of its load.

In a noteworthy way, the intensity of the force induced in the coupling device 3 is measured with a predetermined frequency of measurement so as to achieve a substantially continuous monitoring of the intensity of the force induced in said coupling device 3.

The frequency of measurement as well as moreover the number of measurements necessary to be able to establish an average value can be determined by trials according to the materials used.

In a way likewise noteworthy:

- the intensity of the force induced in the coupling device 3 by the trailer vehicle 1 is measured in the two possible directions of stress of this coupling device 3, i.e. in traction and in compression, and
- a piece of information relating to the direction of the force considered is linked to the measured intensity, and
- used in addition to the measured value of the induced force both in calculating an average value and in monitoring the development of the force during an act of braking is the information relating to the direction of the induced force so as to actuate the braking regardless of the direction of displacement of the vehicles 1, 2 connected through the coupling device 3 and regardless of the inclination of the surface on which said vehicles are moving.

In a noteworthy way:

- when the force induced in the coupling device 3 is detected in the direction of compression of said coupling device 3,
  - if, in absolute value, the difference D between the measured intensity of the induced force and said target value 10 is greater than a first predetermined threshold value A, then the braking is increased E1, whereas
  - if, in absolute value, the difference D between the measured intensity of the induced force and said target value 10 is less than said first predetermined threshold value A, then the braking E2 is maintained in the same state,
- when the force induced in the coupling device 3 is detected in the direction of traction of said coupling device 3,
  - if, in absolute value, the difference D between the measured intensity of the induced force and said target value 10 is less than a second predetermined threshold value B, then the braking is decreased F1,
  - if, in absolute value, the difference D between the measured intensity of the induced force and said target value 10 is greater than said second predetermined threshold value B, but less than a third predetermined threshold value C, then the braking is maintained in the same state F2,
  - if, in absolute value, the difference D between the measured intensity of the induced force and said target value 10 is greater than said third predetermined threshold value C, then the braking is increased F3.

As already mentioned, FIG. 2 consists of a table containing two graphs G1 and G2 illustrating in a time dependency diagram commands (E1, E2, F1, F2, F3) given to the braking device of the trailer vehicle, depending upon the direction of stress of the coupling device (graph G1 for the direction of compression, graph G2 for the direction of traction), and the difference D noted between the measured intensity of the induced force and said target value 10. In the graphs G1 and G2, the difference D between the measured intensity of the induced force and the target value can, in absolute value, develop between the value zero (O) and a value greater than zero. In the graph G1, a line parallel to the time axis T represents a first threshold value, marked A. In the graph G2, there are two lines parallel to the time axis T, one, marked B, representing a second threshold value and the other, marked C, representing a third threshold value.

The expressions "the braking is increased," "the braking is maintained in the same state," and "the braking is decreased" signify, for example, that the pressure is increased of a hydraulic fluid for control of the braking elements, that this pressure is maintained, that this pressure is reduced, respectively.

The method according to the invention allows a dynamic adaptation of the target value, i.e. the reference value owing to the fact that this value is calculated continuously.

The method according to the invention permits taking into account the situation of the vehicles (moving forward or backing up on a level or inclined surface) which makes possible a braking adapted to said situation.

With the methods using a fixed target value, the difference between the target value and the intensity value measured at the moment of an act of braking, does not reflect the reality of the situation and the braking of the trailer vehicle is not optimal.

The aforementioned technical features of the method according to the invention make it possible to ensure:

- the braking of the trailer vehicle 1 when the towing 2 and trailer 1 vehicles must come to a stop when climbing or must be able to back up, in a controlled way, on a declivity which they have previously ascended,
- the absence of braking when the towing 2 and trailer 1 vehicles back up on a declivity which they have previously descended, thus avoiding the conventional brake release systems during such a maneuver.

In keeping with the invention, to detect the instant starting at which the towing vehicle 2 and the trailer vehicle 1 are about to roll, the switching on of voltage to a motor means element 6 of the towing vehicle 2 is monitored. For example, monitored is the switching on of voltage resulting from maneuvering an ignition key for an electric ignition contact (not shown) on the towing vehicle 2.

Such a signal of switching on voltage is provided conventionally on an electrical connection part (not shown) situated at the rear of a towing vehicle equipped with a coupling device. Such a connecting part makes it possible to transmit to the trailer vehicle different electrical signals, such as control signals for luminous indicators of change of direction, control signals for luminous position indicators, control signals for luminous braking indicators, an electrical supply current for a device situated on the trailer vehicle. Such a part is widely known, and it is a question of a thirteen pole connector of standardized type known under the reference ISO 11446. The towing vehicle 2 has such a part of female type, and the trailer vehicle 1 thus has a male-type part.

Preferably, but not obligatorily, for control of the braking device 7 of the trailer vehicle 1, an indication is obtained at the level of each wheel 4 of the trailer vehicle 1 relating to the rotation of that wheel 4, and the indications about the rotation of each of said wheels 4 of the trailer vehicle 1 are taken into account so as to prevent their blockage in braking phase.

In a noteworthy way, a switching off of voltage to a motor means element 6 of the towing vehicle 2 is monitored and when such a switching off of voltage is detected, the braking device 3 of the trailer vehicle 1 is actuated so as to stop said trailer vehicle 1.

These technical features make it possible to ensure the stopping of the trailer vehicle in the event of failure of the coupling device 3, for instance in the case of breakage.

The braking device 7 for implementation of the method according to the invention is noteworthy in that the control circuit 72 for its braking elements 71 comprises at least one controlling apparatus 73 ensuring the following operations:

to monitor and detect the instant starting at which the towing vehicle 2 and the trailer vehicle 1 are about to roll, and starting at that instant,
at least intermittently, to measure the intensity of the force induced in the coupling device 3, and
for a measuring period of predetermined duration, to calculate the average value of the intensity of the induced force and to store that average value,
upon completion of storing an average value, to repeat the steps of measuring, of calculating a new average value, then of storing this new average value replacing the average value previously stored,
with a view to initiating the actuation of the braking elements 71 of the trailer vehicle 1 at any chosen instant after calculation of an average value, to take as a target value 10 the average value of the intensity of the induced force which has been calculated in the measurement period preceding the instant chosen for actuating said braking.

In a noteworthy way, furthermore, to command the actuation of the braking elements 71 of the trailer vehicle 1 at any chosen instant before calculation of an average value, the controlling apparatus 73 is designed to ensure the following operations:

to monitor and detect the production of a signal 11 of operation of an actuation element 83 for a braking device 8 of a towing vehicle 2, this signal making known the instant chosen for actuation of the braking,
when such an operational signal has been detected, to determine whether the intensity of the force induced in the coupling device 3 by the trailer vehicle 1 deviates from a tolerated threshold predetermined with respect to a previously stored target value 10,
to initiate the actuation of the braking elements 71 of the trailer vehicle 1 in the case where the intensity of the force induced in the coupling device 3 by the trailer vehicle 1 deviates from a tolerated threshold predetermined with respect to the target value 10.

Also in a noteworthy way, the controlling apparatus 73 is designed to monitor the production on the towing vehicle 2 of a signal 11 which, referred to as the operational signal, is an electrical signal 11 produced to activate the operation of luminous signals intended to indicate the use of the brakes of said towing vehicle 2, and thus make known the actuation of the braking device 8 of this vehicle.

In a manner also noteworthy, the controlling apparatus 73 is designed to interrupt, when the actuation of the braking is detected, the process of calculation of an average value for the force induced in the coupling device 3 and to monitor the development of the force induced in said coupling device 3, and, when the braking has been achieved, to resume the process of calculation of the average value for the force induced in the coupling device 3.

Also in a noteworthy way, the controlling apparatus 73 is designed to measure the intensity of the force induced in the coupling device 3 with a predetermined frequency of measurement so as to achieve a substantially continuous monitoring of the intensity of the force induced in said coupling device 3.

Also in a noteworthy way, the controlling apparatus 73 is designed:

to measure the intensity of the force induced in the coupling device 3 by the trailer vehicle 1 in the two possible directions of stress of this coupling device 3, i.e. in traction and in compression, and
to link to the measured intensity a piece of information relating to the direction of the force considered, and
in addition to the measured value of the induced force, to make use of the information relating to the direction of the induced force, both in calculating an average value and in monitoring the development of the force during an act of braking, so as to actuate the braking regardless of the direction of displacement of the vehicles 1, 2 connected through the coupling device 3 and regardless of the inclination of the surface on which said vehicles are moving.

In a manner likewise noteworthy, the controlling apparatus 73 is designed to ensure the following operations:

when the force induced in the coupling device 3 is detected in the direction of compression of said coupling device 3,
increasing of the braking if, in absolute value, the difference D between the measured intensity of the induced force and said target value 10 is greater than a first predetermined threshold value A,
maintaining the braking in the same state if, in absolute value, the difference D between the measured intensity of the induced force and said target value 10 is less than said first predetermined threshold value A,
when the force induced in the coupling device 3 is detected in the direction of traction of said coupling device 3,
reducing the braking if, in absolute value, the difference D between the measured intensity of the induced force and said target value 10 is less than a second predetermined threshold value B,
maintaining the braking in the same state if, in absolute value, the difference D between the measured intensity of the induced force and said target value 10 is greater than said second predetermined threshold value B, but less than a third predetermined threshold value C,
increasing the braking if, in absolute value, the difference D between the measured intensity of the induced force and said target value 10 is greater than said third predetermined threshold value C.

In a manner likewise noteworthy, the controlling apparatus 73 is designed to ensure the following operations:

monitoring and detecting the instant starting at which the towing vehicle 2 and the trailer vehicle 1 are able to roll.

In a likewise noteworthy and preferred manner, the controlling apparatus 73 is designed to ensure the following operations:

monitoring and detecting a switching on of voltage to a motor means element 6 of the towing vehicle 2, i.e. an occurrence indicating the instant starting at which the towing vehicle 2 and the trailer vehicle 1 are about to roll.

Finally, in a preferable, but non-limiting, way, the controlling device 73 is designed to ensure the following operations:

obtaining at the level of each wheel 4 of the trailer vehicle 1 an indication relating to the rotation of that wheel 4, and
taking into account the indications about the rotation of each of said wheels 4 of the trailer vehicle 1 so as to prevent their blocking in braking phase.

In a noteworthy manner, the controlling apparatus 73 is designed to monitor a switching off of voltage to a motor means element 6 of the towing vehicle 2 and when such a switching off is detected to actuate the braking device 3 of the trailer vehicle 1 so as to stop said trailer vehicle 1.

These features make it possible to ensure the stopping of the trailer vehicle in the event of failure of the coupling device, for example in the case of breakage.

In a likewise noteworthy way, the force sensor 30 is disposed in a part of the coupling device connected to the trailer vehicle 1.

One of the interesting aspects of the device according to the invention is that it does not require any special installation on the towing vehicle.

The method implemented in this device ensures its automatic calibration as a function of the load of the trailer vehicle and this through the indirect means of the regulation of the braking.

With this method implemented in the device according to the invention, the trailer vehicle is no longer braked inopportunely and the braking is also ensured and regulated when the trailer vehicle is backing up.

Finally, the method according to the invention is compatible with the use of a "retarder" device.

The control device according to the invention is particularly advantageous because it can be placed entirely on the trailer vehicle, and a trailer vehicle can thus be obtained which is compatible with any towing vehicle under the condition that this towing vehicle delivers a signal of operation of its braking device, which is the case, for example, with an electrical connecting device between vehicles implementing a thirteen pole connector of standardized type known under the reference ISO 11446.

What is claimed is:

1. A method for controlling a braking device equipping a trailer vehicle, connected through a coupling device to a towing vehicle, the towing vehicle being itself equipped with a braking device provided with an actuation element, according to which method, when braking the towing vehicle:
    an intensity of a force induced in the coupling device is measured, at least at a given instant, then
    the measured intensity of the induced force at the given instant is compared with a target value determined beforehand and, when a difference between the measured intensity of the induced force and said target value deviates from a predetermined tolerated threshold, an actuation of braking elements of the trailer vehicle is initiated to influence the braking of said trailer vehicle, and
    the aforementioned steps of measuring, comparing, and initiating the braking are repeated until the difference between the measured intensity of the induced force and the target value is less than the predetermined tolerated threshold,
wherein
    through monitoring, an instant starting from which the towing vehicle and the trailer vehicle are about to roll is detected, then, starting from that instant,
    at least in an intermittent way, the intensity of the force induced in the coupling device is measured and,
    for a period of measurement of predetermined duration, an average value of the intensity of the induced force is calculated and is stored,
    after completion of the storage of an average value, the steps of measuring, calculating a new average value then of storing this new average value, replacing the average value previously stored are repeated,
    with a view to initiating the actuation of the braking elements of the trailer vehicle at any chosen instant after the calculation of an average value, taken as the target value is the average value of the intensity of the induced force which has been calculated in the period of measurement preceding the instant chosen to initiate said braking.

2. The method according to claim 1, wherein to initiate the actuation of the braking elements of the trailer vehicle at any chosen instant after the calculation of an average value:
    a production is monitored on the towing vehicle of a signal, referred to as the operational signal, which indicates the actuation of its braking device and thus the instant chosen to initiate the braking of the vehicles, and
    when the force induced in the coupling device by the trailer vehicle deviates with respect to the tolerated threshold predetermined with respect to the target value, the actuation of the braking elements of the trailer vehicle is initiated, with a view to correcting the intensity of said induced force, only if the signal of operation of the braking device of the towing vehicle has been detected beforehand.

3. The method according to claim 1, wherein a production is monitored on the towing vehicle of a signal which, referred to as the operational signal, is an electrical signal produced to activate the operation of luminous signals intended to indicate the use of the brakes of said towing vehicle, and thus indicate the actuation of the braking device of the towing vehicle.

4. The method according to claim 2, wherein the production is monitored on the towing vehicle of a signal which, referred to as the operational signal, is an electrical signal produced to activate the operation of luminous signals intended to indicate the use of the brakes of said towing vehicle, and thus indicate the actuation of the braking device of the towing vehicle.

5. The method according to claim 2, wherein, when the actuation of the braking is detected, the process of calculation of an average value for the force induced in the coupling device is interrupted, and a development of the force induced in the coupling device is monitored and, when the braking has been achieved, the process of calculation of the average value for the force induced in the coupling device is resumed.

6. The method according to claim 1, wherein the intensity of the force induced in the coupling device is measured with a predetermined frequency of measurement so as to achieve a substantially continuous monitoring of the intensity of the force induced in said coupling device.

7. The method according to claim 1, wherein:
    the intensity of the force induced in the coupling device by the trailer vehicle is measured in a traction direction and in a compression direction, and
    a piece of information relating to a direction of the force considered is linked to the measured intensity, and
    used in addition to the measured value of the induced force both in calculating an average value and in monitoring a development of the force during an act of braking is the information relating to the direction of the induced force so as to actuate the braking regardless of a direction of displacement of the vehicles connected through the coupling device and regardless of an inclination of the surface on which said vehicles are moving.

8. The method according to claim 7, wherein:
    when the force induced in the coupling device is detected in the direction of compression of said coupling device, if, in absolute value, a difference between the measured intensity of the induced force and said target value is greater than a first predetermined threshold value, then the braking is increased, whereas if, in absolute value, the difference between the measured intensity of the induced force and said target value is less than said first predetermined threshold value, then the braking is maintained in the same state, when the force induced in the coupling device is detected in the direction of traction of said coupling device, if, in absolute value, the difference between the measured intensity of the induced force and said target value is less than a second predetermined threshold value, then the braking is decreased, if, in absolute value, the difference between the measured intensity of the induced force and said target value is greater than said second predetermined threshold value, but less than a third predetermined threshold value, then the braking is maintained in the same state, if, in absolute value, the difference between the measured intensity of the induced force and said target value is greater than said third predetermined threshold value, then the braking is increased.

9. The method according to claim 1, wherein to detect the instant starting at which the towing vehicle and the trailer vehicle are about to roll, a switching on of voltage to a motor means element of the towing vehicle is monitored.

10. The method according to claim 1, wherein, for control of the braking device of the trailer vehicle, an indication is obtained at a level of each wheel of the trailer vehicle relating to the rotation of that wheel, and the indications about the rotation of each of said wheels of the trailer vehicle are taken into account so as to prevent their blockage in braking phase.

11. The method according to claim 1, wherein a switching off of voltage to a motor means element of the towing vehicle is monitored and when such a switching off of voltage is detected, the braking device of the trailer vehicle is actuated so as to stop said trailer vehicle.

12. A braking device for a trailer vehicle intended to be connected to a towing vehicle through a coupling device, the towing vehicle comprising the braking devices, and the braking device comprising an actuation element, wherein this braking device comprises at least one controller that:

measures an intensity of a force induced in the coupling device, at least at a given instant, compares the measured intensity of the induced force at the given instant with a target value determined and, actuates, when a difference between the measured intensity of the induced force and said target value deviates from a predetermined tolerated threshold, braking elements of the trailer vehicle is initiated to influence the braking of said trailer vehicle, and repeats the aforementioned measuring, comparing, and actuating the braking elements, are repeated until the difference between the measured intensity of the induced force and the target value is less than the predetermined tolerated threshold, detects through monitoring, an instant starting from which the towing vehicle and the trailer vehicle are about to roll starting from that instant, measures, at least in an intermittent way, the intensity of the force induced in the coupling device, and calculates and stores, for a period of measurement of predetermined duration, an average value of the intensity of the induced, repeats, after completion of the storage of an average value, the measuring of the intensity of the force and calculating a new average value, stores this new average value by replacing the average value previously stored taking, with a view to initiating the actuation of the braking elements of the trailer vehicle at any chosen instant after the calculation of an average value, as the target value the average value of the intensity of the induced force which has been calculated in the period of measurement preceding the instant chosen to actuating said braking.

13. The device according to claim 12, wherein the controller:

monitors and detects a production of a signal of operation of an actuation element for a braking device of a towing vehicle, this signal making known the instant chosen for actuation of the braking, determines, when such an operational signal has been detected, whether the intensity of the force induced in the coupling device by the trailer vehicle deviates from a tolerated threshold predetermined with respect to a previously stored target value, initiates the actuation of the braking elements of the trailer vehicle when the intensity of the force induced in the coupling device by the trailer vehicle deviates from the tolerated threshold predetermined with respect to the target value.

14. The device according to claim 12, wherein the controller monitors the production on the towing vehicle of a signal which, referred to as the operational signal, is an electrical signal produced to activate an operation of luminous signals intended to indicate the use of the brakes of said towing vehicle, and thus make known the actuation of the braking device of this vehicle.

15. The device according to claim 13, wherein the controller monitors an electrical signal produced to activate the operation of luminous signals intended to indicate the use of the brakes of said towing vehicle, and thus make known an actuation of the braking device of this vehicle.

16. The device according to claim 13, wherein the controller interrupts, when the actuation of the braking is detected, the process of calculation of an average value for the force induced in the coupling device and monitors the development of the force induced in said coupling device, and, when the braking has been achieved, to resumes the process of calculation of the average value for the force induced in the coupling device.

17. The device according to claim 12, wherein the controller measures the intensity of the force induced in the coupling device with a predetermined frequency of measurement so as to achieve a substantially continuous monitoring of the intensity of the force induced in said coupling device.

18. The device according to claim 12, wherein the controller:

measures the intensity of the force induced in the coupling device by the trailer vehicle in a traction direction and in a compression direction, and links to the measured intensity a piece of information relating to a direction of the force considered, and makes use of, in addition to the measured value of the induced force, the information relating to the direction of the induced force, both in calculating an average value and in monitoring the development of the force during an act of braking, so as to actuate the braking regardless of the direction of displacement of the vehicles connected through the coupling device and regardless of the inclination of the surface on which said vehicles are moving.

19. The device according to claim 18, wherein the controller:
when the force induced in the coupling device is detected in the direction of compression of said coupling device,
increases the braking if, in absolute value, a difference between the measured intensity of the induced force and said target value is greater than a first predetermined threshold value,
maintains the braking in the same state if, in absolute value, the difference between the measured intensity of the induced force and said target value is less than said first predetermined threshold value,
when the force induced in the coupling device is detected in the direction of traction of said coupling device,
reduces the braking if, in absolute value, the difference between the measured intensity of the induced force and said target value is less than a second predetermined threshold value,
maintains the braking in the same state if, in absolute value, the difference between the measured intensity of the induced force and said target value is greater than said second predetermined threshold value, but less than a third predetermined threshold value,
increases the braking if, in absolute value, the difference between the measured intensity of the induced force and said target value is greater than said third predetermined threshold value.

20. The device according to claim 12, wherein the controller monitors and detects the instant starting at which the towing vehicle and the trailer vehicle are about to roll.

21. The device according to claim 12, wherein the controller monitors and detects an occurrence indicating the instant starting at which the towing vehicle and the trailer vehicle are about to roll.

22. The device according to claim 12, wherein the controller:
obtains at the level of each wheel of the trailer vehicle an indication relating to the rotation of that wheel, and
takes into account the indications about the rotation of each of said wheels of the trailer vehicle so as to prevent their blocking in braking phase.

23. The device according to claim 12, wherein the controller monitors a switching off of voltage to a motor means element of the towing vehicle, and
actuates, when such a switching off is detected, the braking device of the trailer vehicle so as to stop said trailer vehicle.

24. The device according to claim 12, wherein, to ensure the operation of monitoring and detecting, the controller comprises a force sensor disposed in a part of the coupling device connected to the trailer vehicle.

* * * * *